No. 754,511. PATENTED MAR. 15, 1904.
J. W. SPRAGUE.
WOLF TRAP.
APPLICATION FILED MAR. 29, 1902.
NO MODEL.

Witnesses
Geo Thom Jr.
Watts T. Estabrook

Inventor
Joseph W. Sprague
by Ralph S. Warfield
Attorney

No. 754,511. Patented March 15, 1904.

UNITED STATES PATENT OFFICE.

JOSEPH W. SPRAGUE, OF PONCHO SPRINGS, COLORADO.

WOLF-TRAP.

SPECIFICATION forming part of Letters Patent No. 754,511, dated March 15, 1904.

Application filed March 29, 1902. Serial No. 100,642. (No model.)

*To all whom it may concern:*

Be it known that I, JOSEPH W. SPRAGUE, a citizen of the United States, residing at Poncho Springs, in the county of Chaffee and State of Colorado, have invented a new and useful Game-Trap, known as a "Wolf-Trap for Entrapping Wolves, Coyotes, Foxes, and other Game," and which I believe will be more effective than any trap heretofore invented for the purpose of entrapping said animals, of which the following is a specification.

My invention relates to an improvement in animal-traps, and is more particularly applicable to traps for catching wolves, coyotes, foxes, and other large game, the objects being to provide a device of this nature which will be strong and durable, and yet cheaply and easily constructed, and one which will be caused to operate by the animal when the latter endeavors to remove the bait and will catch the animal's head instead of its leg or tail, as is usually the case.

To this end my invention consists in a pair of toothed jaws pivotally secured to one another at their rear ends and provided with means tending normally to bring the jaws together and a trigger-hinge secured to one jaw, the trigger comprising two members pivotally secured to one another, the upper free end of the trigger adapted to engage the opposite jaw to retain the jaws in open position, and means on the trigger for securing the bait thereto.

With these and other objects in view my invention consists in certain novel features of construction and combinations of parts, such as will be more fully described hereinafter, and particularly pointed out in the claims.

Figure 1:
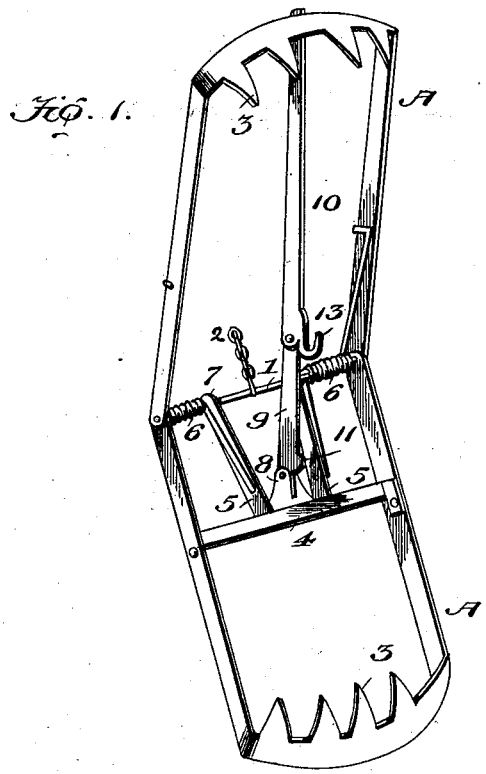
Figure 2:
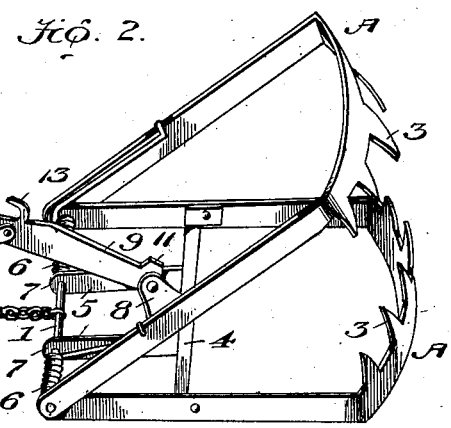

In the accompanying drawings, Figure 1 is a perspective view of my improved trap, showing the jaws in open position; and Fig. 2 is a similar view showing the jaws nearly closed.

A A indicate the two jaws pivotally secured at their rear ends to a rod 1, to which a chain 2 may be attached, the chain being secured to a stake, tree-trunk, or other suitable stationary object to prevent the trap from being dragged or carried away. The free ends of the jaws are armed with intermeshing teeth 3 3. The lower or base jaw may be provided with a cross-bar 4, extending from side to side of the jaw and serving to strengthen the trap, and braces 5 5 extend from this cross-bar 4 to the rod 1, to each of which the braces are secured.

Mounted on the rod 1 at each end thereof and within the sides of the jaws are strong springs 6 6, one end of each spring adapted to engage well up on the sides of the upper jaw to afford a good leverage, and the opposite ends of the springs are rigidly secured to the braces 5 5. The ends 7 7 of the braces serve to confine the springs between the rear ends of the jaws and themselves.

Suitably supported at a point preferably centrally of the cross-bar 4 is a slotted ear 8, to which is pivotally secured within the slot a trigger. The trigger consists of a pair of toggle-jointed members 9 10, pivotally secured to each other at their adjacent ends, the member 9 being provided with a stop 11 at its lower end adapted to engage the lug 8 to limit the forward movement of the trigger, and a lug 12 is located at its upper end, which lug is adapted to be engaged by the member 10 and serves to limit the forward movement thereof. The lug 12 is located slightly to one side of the longitudinal axes of the two members, so that the line of tension of the jaws when set or open is a slight distance to one side of the dead-center, which arrangement operates to prevent any accidental tripping of the trap.

A hook 13 is formed or secured to the member 9 and is adapted to receive the bait.

The member 10 of the trigger is slightly cut away at its connection with member 9 to enable the member 10 to pass the dead-center and rest against the lug 12, and the upper or free end of this member is provided with a step or recess 14, adapted to receive the jaw and retain the trap in its set position.

The operation of the device is easily understood. The animal approaches the trap and seizes the bait on hook 13, attempting to make off with it; but the pull exerted by the animal in so doing is sufficient to bend the toggle-jointed trigger forwardly, so that the member 10 will pass the dead-center, whereupon the tension of the springs 6 6 is free to force both jaws quickly together, catching and securely holding the animal's head therebetween. The trap being of skeleton form is generally placed against any suitable object when set in order that the animal may not approach it from the rear, and the springs operate to move both jaws simultaneously toward one another on the rod 1 instead of exerting their force upon one jaw only.

It is obvious that changes might be made in the form and arrangement of the several parts described without departing from the spirit and scope of this invention, and hence I do not wish to limit myself to the exact construction herein set forth; but,

Having thus fully described my invention, what I claim as new, and desire to secure by Letters Patent, is—

1. A trap comprising a pair of jaws, a rod to which the rear ends of the jaws are pivotally secured, a coiled spring mounted on the rod, a cross-bar carried by one of the jaws, a brace extending between and connecting the cross-bar and rod, one end of the spring slidingly engaging a jaw, the opposite end of the spring secured to the brace, the spring confined between the brace and the sides of the jaws and a toggle-jointed trigger, the lower end of the trigger pivotally secured to one of the jaws and means for securing the bait to the trigger, the upper end of the trigger removably engaging the remaining jaw when the trap is set.

2. A trap comprising a pair of jaws, a rod to which the rear ends of the jaws are hinged, means mounted on the rod for normally retaining the jaws in closed position and a trigger comprising a pair of toggle-jointed members, one of the members provided with a stop located slightly to one side of the longitudinal axes of the members, the remaining member adapted to engage the stop, and means on one of the members for receiving the bait, one end of the trigger adapted to removably engage a jaw.

3. A trap comprising a pair of jaws, a rod to which the jaws are pivotally secured, means normally tending to retain the jaws in closed position, an ear, a trigger pivotally secured thereto, the trigger consisting of a pair of toggle-jointed members, one of the members provided with a stop located to one side of the pivot, the other member provided with a cut-away portion in order that it may pass the center and lie against the stop, the upper end of the last-named member having a step formed therein to receive a jaw when the trap is set and a bait-hook located on the first-named member.

4. A trap comprising a plurality of members, means tending to force the members together and a trigger for retaining the members in open position, the trigger comprising a pair of hinged levers, one of the levers secured to one of the members and the other lever adapted to have frictional contact only with the other of said members.

In testimony whereof I have signed my name to this specification, in the presence of two subscribing witnesses, this 28th day of February, A. D. 1902.

JOSEPH W. SPRAGUE.

Witnesses:
  HUGH FRENCH,
  F. L. BATEMAN.